United States Patent
Reighter

[15] 3,675,392
[45] July 11, 1972

[54] ADSORPTION-DESORPTION METHOD FOR PURIFYING SF$_6$

[72] Inventor: David H. Reighter, Roslyn, Pa.

[73] Assignee: I-T-E Imperial Corporation, Philadelphia, Pa.

[22] Filed: Jan. 30, 1970

[21] Appl. No.: 6,998

[52] U.S. Cl. ................................ 55/25, 55/35, 55/75
[51] Int. Cl. ........................................... B01d 53/14
[58] Field of Search ............ 55/21, 29, 58, 71, 73, 75, 35/275, 387, 389, 33, 251, 35

[56] References Cited

UNITED STATES PATENTS

| | | |
|---|---|---|
| 3,085,379 | 4/1963 | Kiyonaga et al. ................... 55/75 |
| 3,264,803 | 8/1966 | Read ............................... 55/208 |
| 3,505,783 | 4/1970 | Graham ............................ 55/33 |
| 3,311,454 | 3/1967 | Kemeny et al. .................... 55/387 |
| 3,155,468 | 11/1964 | Montgareuil ...................... 55/58 |

Primary Examiner—Charles N. Hart
Attorney—Ostrolenk, Faber, Gerb & Soffen

[57] ABSTRACT

A clear, transparent container is filled with a molecular sieve of 10 angstrom pore size. A vacuum is drawn on the interior of the container to extract purified SF$_6$ therefrom. Contaminated SF$_6$ is then loaded into the evacuated sieve for the next purifying cycle. A light gas exhaust valve is provided at the top of the container. When the sieve is loaded with moisture and contaminants, the molecular sieve material is replaced.

3 Claims, 2 Drawing Figures

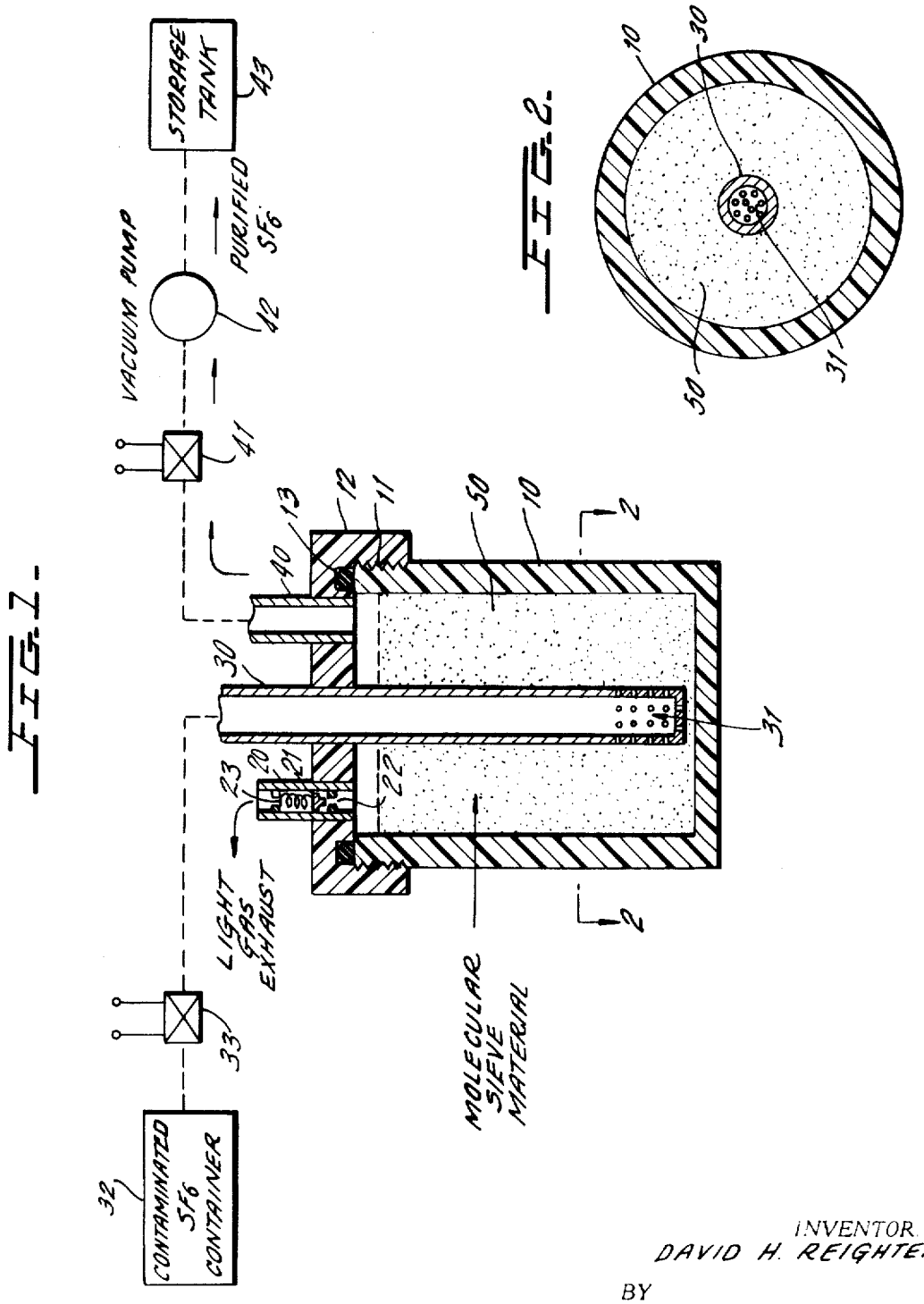

3,675,392

ADSORPTION-DESORPTION METHOD FOR PURIFYING SF

FIELD OF INVENTION

This invention relates to a process for the purification of heavy gases such as sulfur hexafluoride used in connection with electrical apparatus, in which the contaminated gas is loaded into an evacuated molecular sieve, and the gas is then withdrawn from the molecular sieve, leaving behind moisture and other contamination products.

PRIOR ART

The use of heavy gases, such as sulfur hexafluoride and other hexafluorides, have well-known properties which are useful with electrical apparatus, including a high-dielectric constant, and the ability to efficiently deionize arcs. Thus, high-voltage circuit breakers are well known which use sulfur hexafluoride under pressure as both a high dielectric medium and as an interrupting medium.

To maintain the efficiency of the sulfur hexafluoride, the gas must be kept free of substantial contamination and moisture. Contamination products will be generated during arc interruption, for example. It is, therefore, necessary, periodically to purify the gas. This has been done typically by freezing and condensing the gas. This, however, requires expensive pumps and a complicated mechanism.

SUMMARY OF INVENTION

A molecular sieve is evacuated, and adsorbs pure $SF_6$ gas out of a contaminated mixture. Light gases are dispersed throughout the interstices of the sieve and are withdrawn by reducing the cell pressure. The sieve is then unloaded by evacuation to draw off the pure gas which is moved to a suitable receiver. The fine particle size of the sieve acts as a mechanical filter to remove solid particles. The container may be of clear material so that the moisture saturation level within the container (due to removal of moisture from the gas) may be observed and the sieve material replaced when necessary.

BRIEF DESCRIPTION OF DRAWINGS

FIG. 1 shows the novel apparatus of the invention in cross-section, in connection with schematically shown auxiliary structures.

FIG. 2 is a cross-sectional view of FIG. 1 taken across section line 2—2 in FIG. 1.

DESCRIPTION OF PREFERRED EMBODIMENTS

Referring now to the figures, there is provided a container 10 which may be of any desired material compatible with the gas to be received. Container 10 advantageously is of a transparent material such as poly-carbonate, which is transparent to permit observation of the interior of the container. The wall thickness of the container depends on its size, and, for example, the container 10 may have a volume of 340 cubic inches and a wall thickness of 0.500 inches.

Container 10 has a screw thread 11 on the upper end thereof which is threaded into a cap plate 12, which may be stationarily mounted, and which may be of any suitable material. Cap plate 12 carries a sealing gasket ring 13 for forming a sealed connection to container 10.

Cap 12 carries three tubes 20, 30 and 40, which are suitably secured to and sealed in cap 12. Tube 20 is an exhaust vent tube and carries a valve 21 which is pressed closed against orifice 22 by spring 23. Once the pressure within container 10 exceeds a given value, valve 21 opens to exhaust light gases, as will be later described.

Tube 30 may be of any desired material and extends almost the full length of container 10. Tube 30 is perforated by a plurality of small openings 31, located along approximately the last inch in length thereof, and the bottom of tube 30 is spaced from the bottom of container 10 by about one-eighth inch.

By way of example, tube 30 may be of poly-carbonate plastic material, and can have an internal diameter of 0.500 inches and a wall thickness of 0.062 inches. About 48 perforations 31 are provided, each having a diameter of about 0.062 inches.

Tube 30 is then connected to the chamber 32 containing the contaminated gas which is to be cleaned, through solenoid controlled valve 33. Container 32 can be the tank of a sulfur hexafluoride gas blast interrupter of any desired type.

Tube 40 is an exhaust tube of any desired material and is connected, through solenoid controlled valve 41, to a vacuum pump 42 and storage tank 43.

The interior of the container 10 is then filled with a molecular sieve powder 50 to within about one-fourth inch of the top of the container 10. One suitable material is unloaded 13X molecular sieve, supplied by the Linde Division of Union Carbide.

The novel system operates as follows: Valve 41 is opened and valve 33 closed and pump 42 draws a vacuum within container 10 until its internal pressure is about 2 mm. of mercury. A suitable pressure switch can be provided in the electrical control system to indicate this low pressure. Valve 41 is then closed and valve 33 opened so that the contaminated gas (which is at a pressure greater than the pressure of container 10, and may be up to 10 atmospheres or more) is drawn into chamber 10, through the perforations 31 in tube 30. The $SF_6$ gas component of the contaminated gas will then fill the molecular sieve 50. When tube 30 is at a pressure equal to the pressure of container 32, the valve 33 is closed automatically.

The lighter gases, such as air, which are in the contaminated gas, are not adsorbed, but are homogeneously dispersed throughout the interstices of the cell. Valve 21 is adjusted so that the valve opens against spring 23 at a pressure of from 1 to 5 pounds less than the pressure in container 10 when loaded with $SF_6$. Thus, mostly light gases will bleed through valve 21 until the tank pressure has dropped appropriately. Note that valve 21 could be hand-operated, with valve 21 being manually opened after the sieve is loaded and held open until there is a given pressure drop, for example, of 4 to 5 pounds. This would exhaust about 75 percent of the light gas contamination.

Valve 41 is then opened and pump 42 draws the pure $SF_6$ out of sieve 50 until the pressure within chamber 10 is reduced to, for example, about 2 mm. of mercury stated above. Essentially, clean $SF_6$ gas comes out of sieve 50 and this gas is stored in a suitable receiver 43. All solid particles and moisture will remain trapped in sieve 50. This process is then repeated as frequently as needed. If further purification is desired, several cells could be disposed in series.

By observing the sieve through the transparent walls of container 10, the level of contamination is observed until it has risen to a given height. A moisture-sensitive chemical can be incorporated in the sieve to give a more positive moisture indication. The container 10 is then filled with a new charge of molecular sieve powder.

The embodiments of the invention in which an exclusive privilege or property is claimed are defined as follows:

1. The process of purifying sulfur hexafluoride comprising the steps of:
    a. drawing a vacuum in a container filled with a molecular sieve material;
    b. filling said evacuated container with contaminated sulfur hexafluoride to be purified and which is at a pressure higher than said vacuum;
    c. and evacuating said container a second time to draw therefrom purified sulfur hexafluoride with the contamination products trapped in said molecular sieve.

2. The process of claim 1, wherein said process is continued until said molecular sieve is substantially filled with water and contamination products.

3. The process of claim 1, wherein, after filling said container with said contaminated sulfur hexafluoride, the top of said container is vented until the container pressure is reduced from about 1 to 5 pounds to exhaust relatively light gases from said container.

* * * * *